United States Patent Office 3,022,835
Patented Feb. 27, 1962

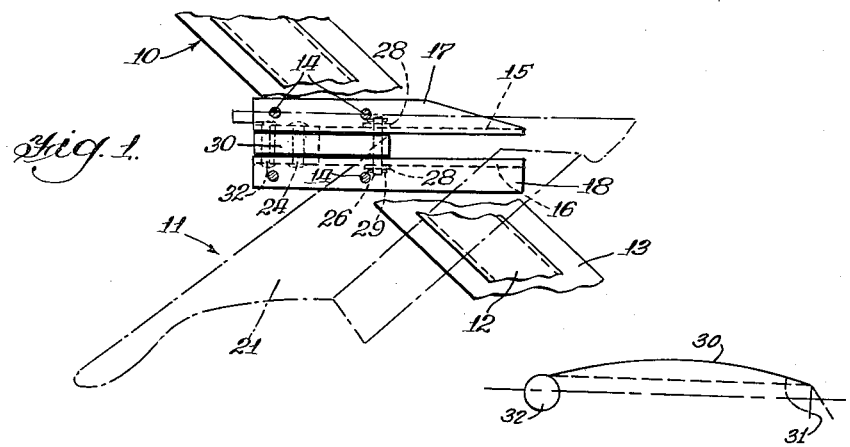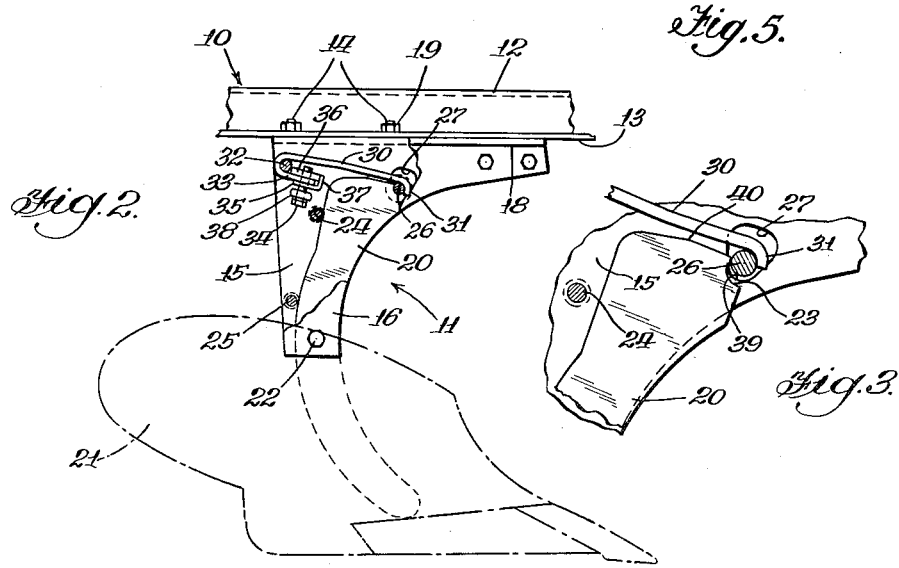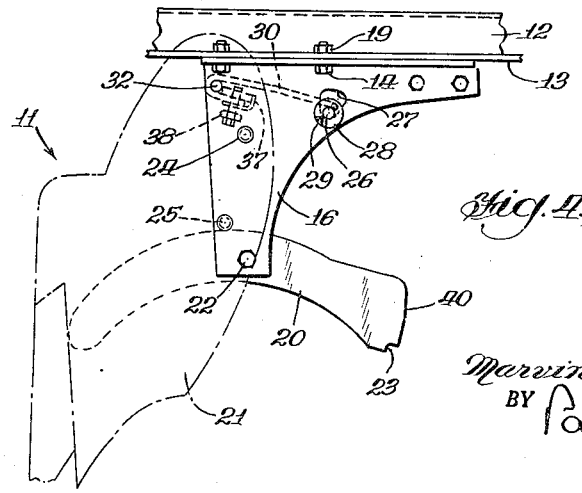

3,022,835
SPRING TRIP FOR PLOWS
Marvin D. Jennings, Naperville, Ill., assignor to International Harvester Company, a corporation of New Jersey
Continuation of abandoned application Ser. No. 595,524, July 2, 1956. This application Feb. 23, 1960, Ser. No. 10,512
16 Claims. (Cl. 172—269)

This invention relates to agricultural implements and particularly to earth working tools mounted on a traveling support and adapted to penetrate below the surface of the ground. More specifically, the invention concerns plows and means for avoiding damage to individual plow bottoms when obstructions are encountered in the ground. This application is a continuation of application Serial No. 595,524, filed July 2, 1956, now abandoned.

The provision of yielding means for mounting plows and other earth penetrating tools on their supports, or for connecting them to a draft source such as a tractor in order to avoid damage to the plow when obstacles are encountered, is old and well-known. One of the means employed involves the provision of a break-away connection of the plow bottom or other earth working tool to its standard, or of the standard to the plow frame to accommodate a swiveling action of the plow unit rearwardly and upwardly out of the way of the obstruction as a result of abnormal draft forces acting on the tool. One of the earliest known types of break-away connections for plows and the like involves the use of a shear pin which breaks under load, allowing the tool to pivot relative to its support. A relatively recent example of the shear pin break-away is seen in the patent to Sigurd 1,635,442, which issued in 1927 and which shows a vertical tool standard pivoted medially of its ends between brackets on the frame, and the upper end of the standard is notched to receive a shear pin which breaks and allows the tool and its standard to trip rearwardly about its pivot when an abnormal draft condition is encountered. In Nordman et al. 2,146,757 the plow bottom was held against tripping by the provision of a notch in the upper end of a member serving as a plow standard, and a roller was spring-pressed into the notch. Excess draft on the plow overcame the tension on the spring, unseated the roller and allowed the plow to trip. In Hintz 2,331,686, a plow standard was pivoted at its upper end between brackets on the plow support, and a roller carried by the support was received in notches in a pair of pivoted plates which were spring-pressed into engagement with the roller on the support to releasably hold it against tripping.

Thus it has become conventional to pivotally mount a plow standard between plates on a frame and to provide means of various kinds for allowing the standard to trip when obstructions are encountered by the plow. However, for various reasons the plow trips previously provided have not been entirely satisfactory, some tripping too readily, some too hard and others, such as the type involving a notch in the standard and a roller spring-held in the notch, being difficult to reset, causing costly operating delays. Furthermore, the operative life of previous plow trips has been shortened by rapid wear resulting from friction between the trip parts. The present invention, therefore, contemplates as its principal object the provision of improved means for mounting a plow-carrying standard on a frame having incorporated therein novel means for holding the plow in operating position in normal operation thereof while accommodating tripping of the plow to an inoperative position when abnormal draft conditions are encountered such as a rock or a tree stump, to avoid damage to the plow.

Another object of the invention is the provision of an improved plow trip of the type wherein a notch in the beam receives a spring-held roller carried by the plow support, and including novel means facilitating the return of the roller to the notch when the plow beam is returned to its operating position after tripping.

A further object of the invention is the provision of improved tripping means for a plow carrying standard of the notch and spring-pressed roller type, wherein the roller is mounted in an oversized opening accommodating limited movement of the roller in the direction of force supplied thereto as well as in a direction to release it from the notch.

Another object of the invention is the provision of a plow trip wherein the parts are held against tripping by a freely rotatable roller received in a notch, and an independent leaf spring engageable with the roller to hold it in the notch, and wherein the roller rolls out of the notch against the spring, providing a substantially frictionless release mechanism for the plow.

Another object of the invention is the provision, in a plow beam trip of the type including a notch in the beam and a roller carried by the plow support, of a triangularly shaped opening in the support and a free roller floatingly mounted in the opening, the roller having limited horizontal and vertical movement in said opening and arranged to facilitate reception of the roller in the notch when the plow is returned to its operating position after tripping.

Other objects and advantages of the invention will become clear from the following details of description when read in conjunction with the accompanying drawings, wherein:

FIGURE 1 is a plan view of the plow structure, with parts broken away, which forms the subject matter of this invention;

FIGURE 2 is a view in side elevation of the plow structure shown in FIGURE 1 illustrating the manner in which the plow unit is mounted upon its support and having parts broken away showing the tripping mechanism of this invention;

FIGURE 3 is an enlarged detail of a portion of the structure shown in FIGURE 2 illustrating the position of certain parts when the plow beam has begun to trip due to excess draft conditions encountered by the plow bottom;

FIGURE 4 is a view similar to FIGURE 2 showing the position of the parts when the plow has completely tripped to an inoperative position, and FIGURE 5 is a schematic drawing of the spring showing the offset relationship of the main body of the spring to its anchor point and to the retaining hook at its other end, and indicating the downward deflection of the main body of the spring when pressure is applied to hook 31.

Referring to the drawings, the numeral 10 designates the diagonal frame of a plow upon which, at spaced locations, are mounted a plurality of plow units 11, only one of which is shown. The diagonal frame member 10, and the hitch means, not shown, by which the implement is connected to a tractive vehicle to be propelled thereby may be of any conventional type, since the invention herein is concerned only with the construction of the individual plow units 11.

The diagonal frame member 10 includes a central vertical portion 12 and a base 13 to which is secured, by bolts 14, a pair of laterally spaced generally triangularly shaped plates 15 and 16 provided with flanges 17 and 18, respectively, which abut the base portion 13 and are apertured to receive the bolts 14 which pass therethrough and the base 13 and are secured in place by nuts 19.

An arcuately shaped generally vertical tool standard 20, having a plow bottom 21 affixed to its lower end, is pivotally mounted upon a bolt 22 carried between the plates 15 and 16 at the lower portion thereof and is provided at its upper end with a notch 23. Thus the tool standard 20 and the plow bottom 21 mounted thereon are capable of swinging in a vertical plane about the axis of the pivot bolt 22 from a normal operating position as indicated in FIGURE 2 to a tripped or inoperative position as indicated in FIGURE 4. Swinging of the plow unit in a counter-clockwise direction is limited by the provision of a stop pin 24 carried between the plates 15 and 16 and the swinging of the plow unit to its tripped position is limited by the provision of another stop pin 25, also mounted between the plates 15 and 16, and shown in FIGURE 4 as engaging the plow standard in its tripped position.

In order to hold the plow unit in the position of FIGURE 2 under normal operating conditions while accommodating swinging thereof rearwardly about the axis of pivot pin 22 when abnormal draft conditions such as obstructions in the ground are encountered, novel tripping mechanism is provided including a transverse rotatable pin or roller 26 loosely carried between the plates 15 and 16 and free to move in an enlarged opening in the form of a triangle 27 formed in each of the plates 15 and 16. The pin 26 is held against transverse displacement with respect to the plates 15 and 16 by means of a washer 28, one of which is provided at each end of the pin on the outsides of the plates 15 and 16, and held in place by cotter keys 29. Roller 26 is received in notch 23 in the forward upper edge of vertical standard 20 and is resiliently held in place therein, when the plow is in the operating position of FIGURE 2, by means of a bent leaf spring 30, the forward end of which is provided with a hook or abutment portion 31 which fits over the roller 26 and engages the roller to hold it in the notch. Roller 26 thus serves as an intermediary through which pressure is exerted by spring 30 to hold the standard against tripping.

The rear end of spring 30 is anchored between the plates 15 and 16 upon a pin 32 and the main body of the spring is bowed outwardly as shown in FIGURES 2 and 4, the rear end of the leaf spring being bent upon itself around the pin 32 to provide a forwardly extending portion 33 which is apertured to receive the shank of a bolt 34 and is confined between the arms 35 and 36 of a clip 37, arm 36 being in the form of a square block welded to the bent end of arm 35 and engaging the pin 32. Arms 35 and 36 are likewise apertured to receive the bolt 34, and the latter is anchored in the position shown by reception in an opening provided in a lug 38 secured in any suitable manner between the plates 15 and 16 such as by slidable reception in openings provided in the plates to facilitate assembly of the tripping mechanism. Spring 30 exerts pressure downwardly to hold pin 26 in place in the notch, and manipulation of bolt 34, of course, regulates this force and varies the amount of soil pressure required to trip the standard.

FIGURE 2 shows the normal operating position of the plow unit with roller 26 held in notch 23 by spring 30, and under normal conditions the roller will be held in place throughout the operation of the plow due to the fact that the included angle formed by the inner face of the hook portion 31 at the point of contact thereof with roller 26 and a line drawn through the anchor point 32 of spring 30 and roller 26 to the point of contact of the latter with said inner face is sufficient to prevent tripping, and in the operating position of the parts shown in FIGURE 2 this angle is approximately ninety degrees. However, pressure upon the plow bottom 21 exerted by the ground thereupon causes the upper end of the tool standard 20 to exert a forward thrust upon the roller 26. When an obstruction is encountered by the plow bottom sufficient to overcome the pressure of the spring 30 holding the roller 26 in the notch 23, the spring is deformed in the manner indicated in FIGURE 3 and roller 26 is forced out of the apex 39 of the triangular opening 27, in which it is seated. The roller revolves against the spring and actually rolls out of the notch, its horizontal movement in the opening 27 being limited by the walls thereof.

The spring is deflected in the manner shown in FIGURE 3 as the angle referred to above increases, exerting rolling friction against the roller until the roller 26 rides over the upper surface 40 of the upper end of the tool standard 20, allowing the plow unit to trip. After the plow has tripped, spring 30 returns roller 26 to the apex 39 of the triangular opening.

The operator of the tractive vehicle by which the plow is propelled through the ground returns the plow unit to its operating position after the obstruction is passed by backing the vehicle and the plow to swing the plow unit in a counter-clockwise direction. The upper end of tool beam 20 acts as a camming surface upon re-engagement thereof with the roller 26 and moves the latter upwardly against the tension in spring 30 and within the confines of the triangular opening 27, until the roller is again received in the notch 23.

The combination of elements herein described provides a highly successful and economical tripping apparatus for moldboard plows and the operation thereof should be clearly understood from the foregoing description. It should also be understood that the provision of the free rotatable roller 26 operating in the triangular notch 27 against the tension of the spring 30 makes it possible to hold the plow unit against tripping in normal operation while allowing it to trip with minimum wear between the parts when abnormal draft conditions are encountered, without displacement of the roller 26 from the confines of the spring 30, thus facilitating the return of the plow unit to its operating position after tripping.

While the invention has been described in its preferred embodiment, it should be understood that modifications may be made therein without departing from the spirit of the invention or the scope of the appended claims.

What is claimed is:

1. In a spring trip device for an implement having a support and a movable part mounted thereon for movement relative to the support from an operating position to a tripped or non-operating position in response to forces acting on said part, a spring having a main body portion, means connecting one end of the spring to the support, the main body of said spring extending from the connection thereof to the support in the direction of movement of said movable part to its tripped position, and means operatively engageable with said movable part to hold it against tripping comprising a hook member at the other end of said spring projecting from said body portion at an angle with respect to a line through said connecting means and said hook member and disposed in the path of tripping movement of the movable part, and an intermediate member carried by the support between the hook and the movable part through which force is transmitted from the movable part to said hook member in a direction to open said hook member, the angle of said hook member with respect to said line through said connecting means and said hook being sufficient to keep the movable part from tripping under normal operating conditions and increasable to release the intermediate member from engagement with the movable part.

2. In a spring trip device for an implement having a support and a movable part mounted thereon for movement relative to the support from an operating position to a tripped or non-operating position in response to forces acting on said part, a spring having a main body portion, means connecting one end of the spring to the support, the main body of said spring extending from the connection thereof to the support in the direction of movement of said movable part to its tripped position, and means operatively engageable with said movable part to hold it against tripping comprising an abutment element at the other end of said spring projecting from said main body portion at an angle with respect to a line through said connecting means and said abutment element member in the path of tripping movement of the movable part and to which force is transmitted from said movable part, the angle of said abutment element with respect to said line through said connecting means and said abutment element being sufficient to keep the movable part from tripping under normal operating conditions and increasable in response to excess force exerted by the movable part to release the latter from its operative engagement with said abutment element.

3. In a spring trip device including a support and a movable part mounted thereon for movement relative to the support from an operating position to a tripped or non-operating position in response to forces acting on said part, a leaf spring having a main body, means connecting said spring to the support, said movable part being movable in a plane generally parallel to said main body, and an abutment element projecting from said main body at an angle with respect to a line through said connecting means and said abutment element and operatively engageable in force transmitting relation with said movable part to yieldably hold the latter against tripping, the angle of said abutment element with respect to said line therefrom to said connecting means being sufficient to keep the movable part from tripping under normal operating conditions and increasable in response to excess force exerted by the movable part to release the latter from its operative engagement with said abutment element.

4. The invention set forth in claim 3, wherein a roller member is carried by the support and is associated with the movable part and forms the means through which motion is transmitted from the movable part to said abutment element.

5. In an agricultural implement, a traveling support, a standard carrying an earth working tool, means mounting the standard on the support for pivoting to a tripped position, and means releasable in response to draft forces acting on the tool for holding the standard against tripping, comprising a spring having a main body portion, said standard being pivotable in a path generally parallel to said main body, means connecting one end of the spring to the support, means serving as a hook at the other end of said spring having an inner contact face operatively engageable with said standard and projecting from the main body portion at an angle with respect to a line through said connecting means and the contact face of said hook means sufficient to hold the standard against tripping under normal operating conditions, said angle being increasable by the force exerted thereagainst by the standard in response to excess draft on the tool to accommodate release of the standard from said hook means.

6. In an agricultural implement, a traveling support, a standard carrying an earth working tool, means mounting the standard on the support for pivoting to a tripped position, and means releasable in response to draft forces acting on the tool for holding the standard against tripping, comprising a spring having a main body portion extending in the direction of pivoting movement of the standard, means connecting one end of the spring to the support, the other end of said spring having a bent portion extending in the path of pivoting movement of the standard and having an inner contact face operatively engageable with said standard and projecting from the main body at an angle with respect to a center line through said connecting means and the contact face of said bent portion sufficient to hold the standard against tripping under normal operating conditions, force exerted against said bent portion by the standard in response to excess draft on the tool being transmitted to the main body of the spring causing deflection thereof toward said center line and an increase in the angle of said bent portion to open the bent portion and release the standard.

7. In an agricultural implement, a traveling support, a standard carrying an earth working tool, means mounting the standard on the support for swinging from an operating position of the tool to a tripped or non-operating position, a spring having a main body portion, means offset from said main body connecting one end of the spring to the support, and means operatively engageable with the standard to hold it against tripping comprising an abutment member at the other end of said spring and projecting from the main body thereof at an angle with respect to a line through said connecting means and said abutment member and in the path of tripping movement of the standard, and an intermediate member carried by the support between the abutment member and the standard through which draft force is transmitted from the standard to said abutment member, the angle of said abutment member with respect to said line through said connecting means and said abutment member being sufficient to keep the standard from tripping under normal operating conditions of the tool and increasable to release the intermediate member from operative engagement with the standard.

8. The invention set forth in claim 7, wherein said intermediate member is a freely rotatable roller mounted in the support by means accommodating translational movement of the roller relative to the support.

9. The invention set forth in claim 8, wherein the means mounting said roller in the support includes an opening in the support adapted to rotatably receive said roller and of sufficient size to accommodate movement of said roller bodily as said angle of said hook increases.

10. In an agricultural implement, a traveling support, a standard carrying an earth working tool, means pivotally mounting the standard on the support for swinging to a tripped position in response to draft forces acting on the tool, and means releasable in response to excess draft on the tool for holding the standard against tripping from its operating position to an inoperative position, comprising a freely rotatable roller member carried by the support and reactable against said standard, said support having an opening to receive said roller of such dimensions as to accommodate both longitudinal and vertical movement of the roller, and means serving as a leaf spring having a connection at one end to the support, the other end of said spring having a bent portion projecting from the spring at an angle with respect to a line through said connection and said bent portion, the inner face of which is engageable with said roller to hold said standard against tripping, the included angle formed by said inner face at its point of contact with said roller member and a line drawn through said connection and said roller member to the point of contact of the latter with said inner face being sufficient to hold the standard against tripping under normal operating conditions.

11. In an agricultural implement a traveling support, a standard carrying an earth working tool at its lower end, means pivotally mounting the standard medially of its ends on the support for swinging to a tripped position in response to draft forces acting on the tool, and means releasable in response to excess draft on the tool for holding said tool against tripping during normal operation, comprising a free roller carried by the support and engageable with the upper end of said standard, said support having an opening therein in which said roller is mounted, a notch formed in said standard to releasably receive said roller, and spring means operatively engageable with said free roller and urging the latter in a direction to be received in said notch, the opening in said support being sufficiently large to accommodate bodily movement of the roller relative to the support and the standard, the action of said spring against said roller being in a direction and of a magnitude to hold the roller against said bodily movement in said opening under normal operating conditions, said roller being bodily movable in said opening and out of said notch upon pivoting of the standard in response to excess draft on the tool.

12. The invention set forth in claim 11, wherein said spring is a leaf spring anchored at one end to the support and having the end thereof remote from its anchor point bent into the form of a hook partly encircling said roller and confining the roller therebetween and said notch, the draft force exerted on the tool and standard being directed against said roller and the hook portion of said spring in a direction tending to straighten the latter and accommodate rolling movement of the roller out of said notch while retaining the roller in said hook.

13. The combination with a supporting frame of a tool-carrying plow standard extending generally vertically and pivotally connected to the frame, said frame including laterally spaced parts flanking the upper portion of said standard, registering opening in said parts, a roller-like member of smaller diameter than and loosely mounted in said openings for free floating in all directions therein, a notch in the upper portion of said standard receiving said roller-like member to prevent tripping the plow standard about its pivotal connection to the frame in response to abnormal draft forces thereagainst, said roller being bodily movable in said openings by said plow standard in response to said abnormal draft forces to accommodate release of said roller from said notch and the resultant tripping of the plow standard, and resilient means urging said roller into said notch.

14. The combination with a supporting frame of a tool-carrying plow standard extending generally vertically and pivotally connected to the frame, said frame including laterally spaced parts flanking the upper portion of said standard, registering openings in said parts, a roller-like member of smaller diameter than and loosely mounted in said openings for free floating in all directions therein, a notch in the upper portion of said standard receiving said roller-like member to prevent tripping the plow standard about its pivotal connection to the frame, said openings being sufficiently large to accommodate movement of the roller out of said notch to accommodate tripping of the plow standard, and a leaf spring secured at one end to said laterally spaced frame parts and operatively engaging said roller at the other end to urge the roller into said notch, said roller being bodily movable in said openings in a direction away from said standard and out of said notch in response to excess draft forces acting on said tool-carrying plow standard.

15. The combination with a supporting frame of a tool-carrying plow standard extending generally vertically and pivotally connected to the frame, said frame including laterally spaced parts flanking the upper portion of said standard, registering openings in said parts, a roller-like member of smaller diameter and loosely mounted in said openings for free floating in all directions therein, a notch in the upper portion of said standard receiving said roller-like member to prevent tripping the plow standard about the pivotal connection thereof to the frame, said openings being sufficiently large to accommodate rolling movement of the roller out of said notch to accommodate tripping of the plow standard, and a leaf spring having a main body anchored at one end to said laterally spaced frame parts, the other end of said spring being bent to partly encircle said roller and resist movement of the latter out of said notch, the draft forces acting on the plow being transmitted through said roller against the bent end of said spring in a direction generally parallel to said main body of the spring to deflect the spring and accommodate release of the roller from the notch.

16. The invention set forth in claim 15, wherein said openings are triangularly shaped and said roller rolls upwardly and outwardly within the confines of said openings between the notch and the spring until it is released from said notch.

References Cited in the file of this patent
UNITED STATES PATENTS

| | | |
|---|---|---|
| 166,979 | Flynn | Aug. 24, 1875 |
| 221,675 | Galloway et al. | Nov. 18, 1879 |
| 251,225 | Hart | Dec. 20, 1881 |
| 264,319 | Mendenhall | Sept. 12, 1882 |
| 281,126 | Patterson | July 10, 1883 |
| 323,004 | Wheeler | July 28, 1885 |
| 372,206 | Damerell | Oct. 25, 1887 |
| 895,587 | Putney | Aug. 11, 1908 |
| 1,078,871 | Olson | Nov. 18, 1913 |
| 2,331,686 | Hintz | Oct. 12, 1943 |
| 2,756,659 | Lindeman | July 31, 1956 |
| 2,850,957 | Silver | Sept. 9, 1958 |